No. 775,728. PATENTED NOV. 22, 1904.
G. L. MILLER.
RIVET.
APPLICATION FILED MAR. 29, 1904.
NO MODEL.

WITNESSES:

INVENTOR
George L. Miller
BY
ATTORNEYS

No. 775,728. Patented November 22, 1904.

UNITED STATES PATENT OFFICE.

GEORGE L. MILLER, OF SOCIALVILLE, OHIO.

RIVET.

SPECIFICATION forming part of Letters Patent No. 775,728, dated November 22, 1904.

Application filed March 29, 1904. Serial No. 200,567. (No model.)

*To all whom it may concern:*

Be it known that I, GEORGE L. MILLER, a citizen of the United States, and a resident of Socialville, in the county of Warren and State of Ohio, have invented a new and Improved Rivet, of which the following is a full, clear, and exact description.

My invention relates to rivets; and its principal objects are to provide a device which will be compartively inexpensive to manufacture and which may be securely fastened in place without danger of injuring the material to which it is attached.

It consists in the various features and combinations hereinafter described and claimed.

Reference is to be had to the accompanying drawings, forming a part of this specification, in which similar characters of reference indicate corresponding parts in all the figures.

Figure 1:
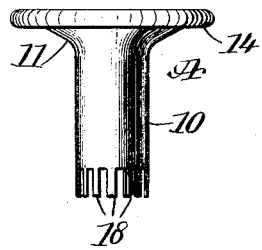
Figure 2:
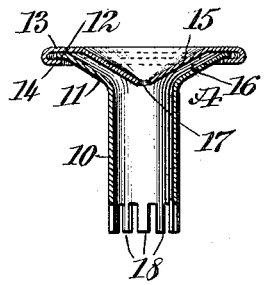
Figure 3:
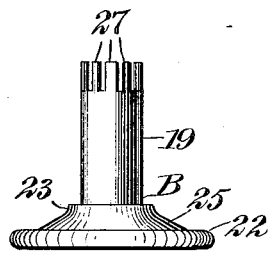
Figure 4:
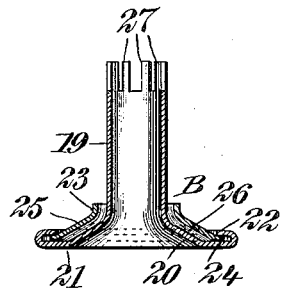
Figure 5:
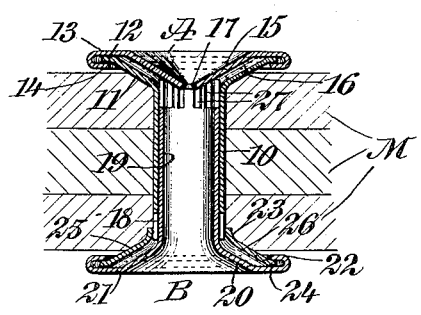
Figure 6:
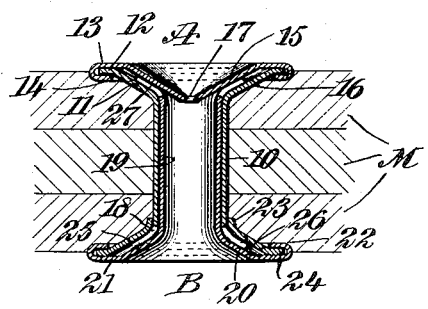

Figure 1 is a side elevation of the outer rivet member. Fig. 2 is a central vertical longitudinal section therethrough. Fig. 3 is a side elevation of the inner member. Fig. 4 is a central vertical longitudinal section therethrough. Fig. 5 shows the two members assembled in layers of material ready to be finally set, and Fig. 6 shows them in their set or riveted position.

A designates an outer rivet member which comprises a shank or tubular portion 10, which has at one end a head-flange 11 of inclined or generally conical form. At the edge of this flange is an annular portion 12 substantially at a right angle to the shank. Upon this portion 12 rests a second head element 13, which embraces the flange at 14 to secure the two elements together. At the center of this last-named element is situated a conical portion 15, the outer wall of which is substantially parallel to the flange 11 and forms therewith an intermediate space 16, communicating with the interior of the shank. At the apex of the cone is shown a contracted opening 17. At the opposite end of the shank from the head are preferably formed a series of separated projections 18.

B indicates an inner rivet member comprising a tubular shank 19, which is of such diameter that it will snugly fit the shank 10. From this projects a head-flange 20 of inclined or conical form, having at its center an opening substantially equal to that of the shank, and this has about its edge a portion 21 substantially at right angles to the shank. The outer periphery of the flange is bent over at 22 parallel to the portion 21 to embrace and secure in place a second head element 23, which contacts with the portions 21 and 22 of its companion at 24. This element 23 has an inclined portion 25, extending substantially parallel to the surface of the flange 20 and terminating adjacent to the juncture of the shank and head. Between these two head elements is formed a space 26, similar to that previously described in connection with the other member, except that it opens outside the shank. At the extremity opposite the head the shank 19 is formed with separated projections 27.

To apply my improved rivet—for example, in such a situation as to a plurality of layers of material M—the member A is inserted through a hole previously made and then the member B placed within it, the projections at the ends of each contacting, respectively, with the surfaces of the elements 15 and 20. Pressure is now applied to the heads, which results in the projections being spread and forced into the spaces 16 and 26. Then upon further pressure the opposite walls of the heads clamp the projections between them and clench or secure the members in place. If it is desired to utilize the rivet as an eyelet, it is only necessary to introduce a punch into the opening 17 and force aside the metal to furnish a passage substantially equal in diameter to the inside of the shank.

My invention may be used in every connection to which the ordinary tubular rivet is applied, such as harness, trunk, and certain kinds of shoe work, and upon heavy cloth goods, and the like, and also in other situations to which its peculiar features especially adapt it. It will be noted that it has a smooth head at each side, and is therefore without rough edges to catch or scratch the material, the clenches not coming in contact with the adjacent surfaces. There is, moreover, no irregular portion for dirt and the like to collect about.

Having thus described my invention, I claim as new and desire to secure by Letters Patent—

1. A rivet comprising two concentric tubular members each of which is provided with a double conical head, there being a space formed within each head.

2. A rivet comprising two concentric tubular members each of which is provided with a double conical head, there being a space formed within each head, one of the spaces communicating with the interior of the associated tubular member and the other opening outside the companion member.

3. A rivet comprising two concentric tubular members each of which is provided with a double conical head, there being a space formed within each head, one of the spaces communicating with the interior of the associated tubular member and the other opening outside the companion member, and separated projections situated at the end of each member opposite the head and adapted to enter the head-space.

4. A rivet comprising two concentric tubular members each of which is provided with a conical head, one of said heads being provided with an opening substantially equal to that of the tubular member, and the companion head having a contracted opening at the apex of the cone.

5. A rivet member comprising a tubular shank having an inclined head-flange, and a conical head portion secured at the edge of the head-flange and spaced from and surrounding it, forming therewith an intermediate space which opens outside the shank.

In testimony whereof I have signed my name to this specification in the presence of two subscribing witnesses.

GEORGE L. MILLER.

Witnesses:
WM. DONSON,
FRED W. CONOVER.